US007276890B1

(12) United States Patent
Kumar

(10) Patent No.: US 7,276,890 B1
(45) Date of Patent: Oct. 2, 2007

(54) PRECISION BANDGAP CIRCUIT USING HIGH TEMPERATURE COEFFICIENT DIFFUSION RESISTOR IN A CMOS PROCESS

(75) Inventor: Ajay Kumar, Atlanta, GA (US)

(73) Assignee: National Semiconductor Corporation, Santa Clara, CA (US)

( * ) Notice: Subject to any disclaimer, the term of this patent is extended or adjusted under 35 U.S.C. 154(b) by 240 days.

(21) Appl. No.: 11/190,215

(22) Filed: Jul. 26, 2005

(51) Int. Cl.
*G05F 3/16* (2006.01)
*G05F 3/02* (2006.01)
*H02H 7/00* (2006.01)

(52) U.S. Cl. ....................................... 323/313; 327/539

(58) Field of Classification Search ................ 323/312, 323/313, 315–317, 907; 327/534, 535, 538, 327/539
See application file for complete search history.

(56) References Cited

U.S. PATENT DOCUMENTS

| | | | | |
|---|---|---|---|---|
| 5,245,273 | A * | 9/1993 | Greaves et al. | 323/313 |
| 5,767,664 | A * | 6/1998 | Price | 323/313 |
| 6,157,245 | A * | 12/2000 | Rincon-Mora | 327/539 |
| 6,600,302 | B2 * | 7/2003 | Ghozeil et al. | 323/313 |

* cited by examiner

*Primary Examiner*—Matthew V. Nguyen
(74) *Attorney, Agent, or Firm*—William W. Cochran; Cochran Freund & Young LLC

(57) ABSTRACT

Disclosed are bandgap circuits that use a resistive divider circuit to modulate the gate voltage of a reference source transistor. The reference voltage transistor is modulated at the base by a voltage that varies inversely with temperature. In this fashion, high sheet resistance poly resistors and diffusion resistors can be used that have very low process variation and minimize the use of die space.

8 Claims, 7 Drawing Sheets

| RESISTANCE TYPE | ρ(Ω/SQ) | TC1 | TC2 |
| --- | --- | --- | --- |
| $R_{POLY}$ | 35 | -715e-6 | 1.026e-6 |
| $R_{DIFFUSION}$ | 1600 | 4.84e-3 | 11.86e-06 |
| $R_{HI\_POLY}$ | 2000 | -3.45e-3 | |

FIG. 2

PRECISION BANDGAP CIRCUIT USING HIGH TEMPERATURE COEFFICIENT DIFFUSION RESISTOR IN A CMOS PROCESS

BACKGROUND OF THE INVENTION a. Field of the Invention

The present invention pertains generally to electrical devices and more specifically to bandgap current and voltage reference circuits.

b. Description of the Background

Reference circuits are needed to bias electronic circuits. Reference sources of electronic circuits use the conduction and valence band difference of the intrinsic substrate material (silicon) to generate a reference voltage or current which may vary as a result of process variations or variations in environmental temperatures. The negative temperature coefficient of the silicon bandgap voltage is cancelled in prior art circuits by using the positive temperature coefficient of thermal voltage to generate the reference source. Typically, low temperature coefficient poly resistors, i.e., on the order of $6\times10^{-4}$, are used to generate a reference source. However, these poly resistors have low sheet resistance, i.e., on the order of 30-40 ohms per square, and as such, consume a large amount of space on the die. In many cases, the poly resistors may consume up to 50 percent of the die space. In addition, poly resistors have large process variations, and many times require expensive laser trimming to provide the needed accuracy that is not available because of process variations.

SUMMARY OF THE INVENTION

An embodiment of the present invention comprises a bandgap reference circuit comprising: first and second transistors that have gates that are connected and are driven by a common gate voltage, the first and second transistors having sizes that are proportional to the current flowing through the first and second transistors so that the voltages at the sources of the first and second transistors are substantially equal; a reference resistor connected to the source of the first transistor; a first reference transistor having an emitter that is connected to the resistor and a collector connected to ground; a second reference transistor having an emitter connected to the second transistor and a collector connected to ground; a resistor divider circuit connected to the base of the first reference transistor; a modulating transistor connected to the resistor divider circuit that modulates the base of the first reference transistor with a fraction of voltage difference between the base and emitter of the modulating transistor to substantially cancel the temperature coefficient of current flowing through the reference resistor.

Another embodiment of the present invention comprises a method of generating a reference voltage in a bandgap circuit comprising: generating a first voltage at the source of a first transistor that is substantially equal to a second voltage at the source of a second transistor by connecting the gates of the first and second transistors to a common driver, and matching the component sizes of the first and second transistors with the amount of current passing through the first and second transistors; connecting the source of the first transistor to a reference resistor; connecting the reference resistor to a first reference transistor; connecting the source of second transistor to a second reference transistor; connecting the base of the first reference transistor to a resistor divider circuit; connecting the resistor divider circuit to a modulating transistor that modulates the base of the first reference transistor with a fraction of the voltage difference between the base and emitter of the modulating transistor so as to substantially cancel the temperature coefficient of current through the reference resistor.

BRIEF DESCRIPTION OF THE DRAWINGS

In the drawings,

FIG. 2 is a table of parameters for various resistance types.

DETAILED DESCRIPTION OF THE EMBODIMENTS

Figure 1:
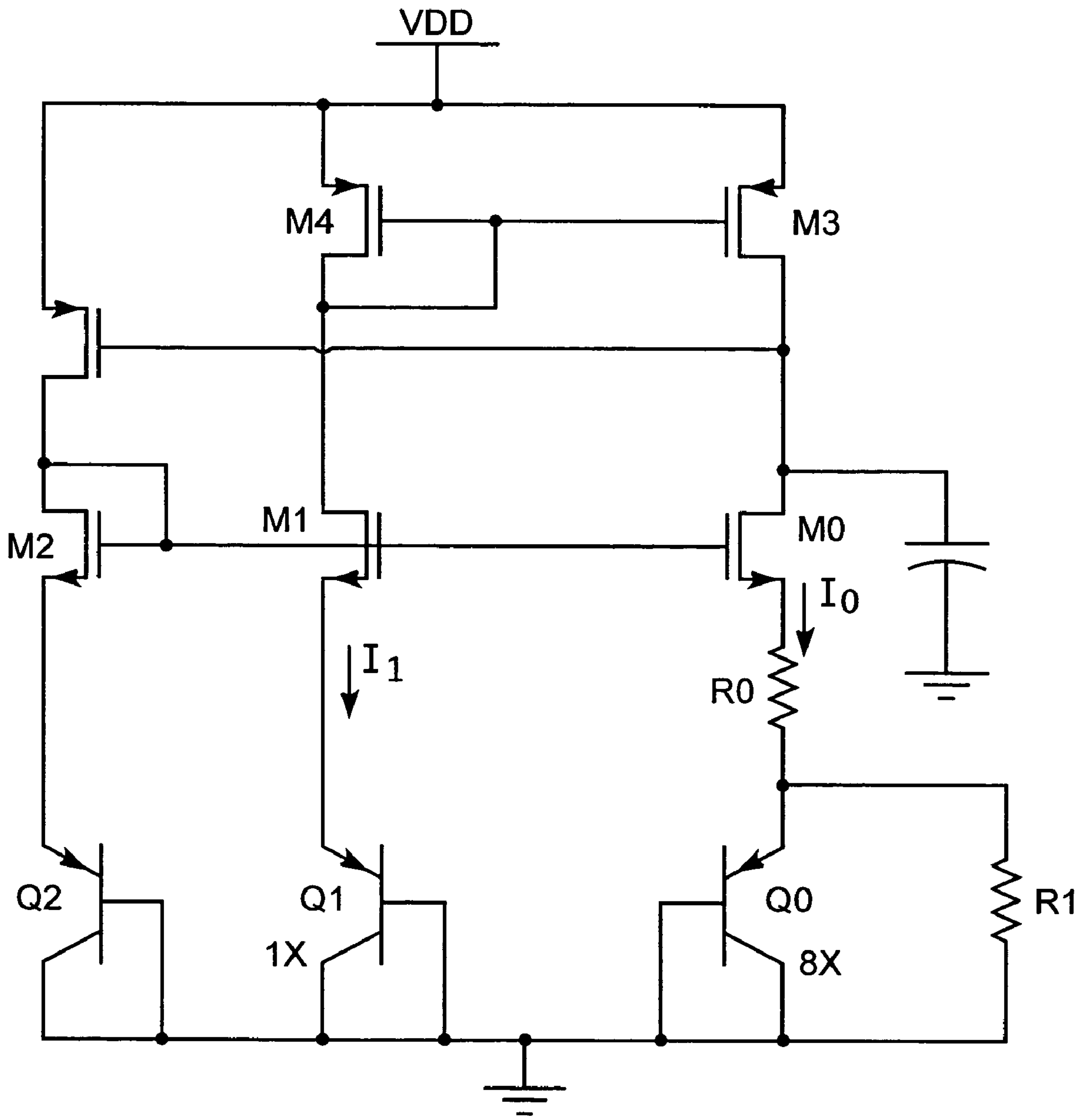
FIG. 1 is a schematic circuit diagram of a classical bandgap reference circuit.

FIG. 1 discloses a classical bandgap reference circuit that uses a substrate vertical PNP transistor of a standard CMOS process to generate a reference current and/or reference voltage source. By setting the device ratio of M0 and M1 the same as the current ratio for the current that flows through M0 and M1, a temperature independent source can be achieved as long as the temperature coefficient of the resistance used for R0 and R1 is sufficiently low, such as that provided by poly resistors, which is on the order of $e^{-06}$. The gates of both M1 and M0 are held at the same potential in the circuit of FIG. 1 by M2. Because the device size ratio of M0 and M1 is the same as the current ratio of the current passing through M0 and M1, the sources of M1 and M0 are the same potential. A0 is the device area of Q0, and A1 is the device area of Q1.

As also shown in FIG. 1, Q0 and Q1 have an area ratio of $A_0/A_1$ which is typically 8 to 1. The voltage drop across $R_0$ ($V_{R0}$) can be determined using Kirchoff's Voltage Law around the loop $Q_0$, $Q_1$, $M_1$, $M_0$ and $R_0$.

$$V_{R0} = V_{GS1} - V_{GS0} - V_{BE0} + V_{BE1} = V_T \ln\left(\frac{A_0 I_1}{A_1 I_0}\right) \quad \text{Eq. 1}$$

$V_T$ is the thermal voltage and is equal to κT/q. The gate to source voltage of M1 ($V_{GS1}$) and the gate to source voltage of M0 ($V_{GS0}$), as pointed out above, are equal since the device ratio size of M1 and M0 are the same as the ratio of the current flowing through them.

As Eq. 1 shows, the voltage drop across $R_0$ is proportional to the thermal voltage ($V_T$). The current $I_0$ flowing through $R_0$ can be determined from the super position theorem as follows:

$$I_0 = \frac{V_{BE1} - V_{BE0}}{R_0} = \frac{\kappa T}{qR_0}\left[\ln\left(\frac{A_0 M}{A_1}\right) + \ln\left(1 + \frac{V_{BE0}}{I_{Q0} R_1}\right)\right] \quad \text{Eq. 2}$$

where κ is the Boltzman Constant, 'M' is current ratio between M0 and M1, 'A' is the area ratio of transistor Q0 and Q1, 'T' is absolute temperature, 'q' is the single electron charge and $I_{Q0}$ is the current in the $Q_0$ device.

By taking the derivative of the current $I_0$ through $R_0$ with respect to temperature, the change in the current $I_0$ can be determined as a function of the change in absolute temperature. The first order temperature derivative of $I_0$ is given in Eq. 3.

$$\frac{\partial I_0}{\partial T} = \frac{\kappa \ln(AM)}{qR_0} + \frac{1}{R_0}\left(\frac{V_T}{I_{Q0}R_1 + V_{BEO}} \times \frac{\partial V_{BEO}}{\partial T}\right) \quad \text{Eq. 3}$$

The current $I_0$ will be temperature independent if the right hand side of Eq. 3 is zero. However, $\partial V_{BEO}/\partial T$ has second and higher order temperature dependence which is non-linear so that this term cannot simply be set to zero. Further, the first and second order temperature coefficient of the resistor $R_0$ must be small, which holds true for poly resistors having low sheet resistance, but does not hold true for other types of resistors having higher sheet resistance. For example, as shown in FIG. 2, diffusion resistors (well resistors) and high sheet resistance poly resistors have resistances that are almost two orders of magnitude higher than commonly used poly resistors. The temperature coefficient of diffusion resistors and high poly resistors therefore cannot be neglected. Eq. 4 below takes into account the temperature coefficient of R0 in the absence of R1.

$$I_0 = \frac{V_{BEI} - V_{BEO}}{R_0(1 + \alpha_1 T + \alpha_2 T^2)} = \frac{V_T}{R_0(1 + \alpha_1 T + \alpha_2 T^2)} \times \ln\left(\frac{A_0 I_1}{A_1 I_0}\right) \quad \text{Eq. 4}$$

The first order temperature coefficient of $I_0$ is given by Eq. 5.

$$\frac{\partial I_0}{\partial T} = \frac{\kappa}{qR}\ln\left(\frac{A_0 I_1}{A_1 I_0}\right)\frac{1 - \alpha_2 T^2}{(1 + \alpha_1 T + \alpha_2 T^2)} \quad \text{Eq. 5}$$

Eq. 5 suggests that at a temperature equal to $1/\sqrt{a_2}$, the temperature coefficient of a current reverses its sign. Thus, above the coefficient inversion temperature ($T_0$), the device has a negative temperature coefficient instead of a positive temperature coefficient.

Referring to FIG. 2, the coefficient inversion temperature for a poly resistor is 1090° C., whereas the coefficient inversion temperature for a well resistor is 17° C. Hence, poly resistors having low sheet resistance work well in the circuit FIG. 1 since the coefficient inversion temperature of the poly resistors is well above the environmental temperatures to which the circuit of FIG. 1 is subjected. The problem, again, is poly resistors require a large die area and process variations are large. Laser trimming is frequently required to provide the necessary accuracy. Well resistors and high sheet resistance poly resistors, however, have coefficient inversion temperatures that are within the temperature of interest and as such, provide a negative temperature coefficient that does not cancel out the negative temperature coefficient of the silicon.

Figure 3:
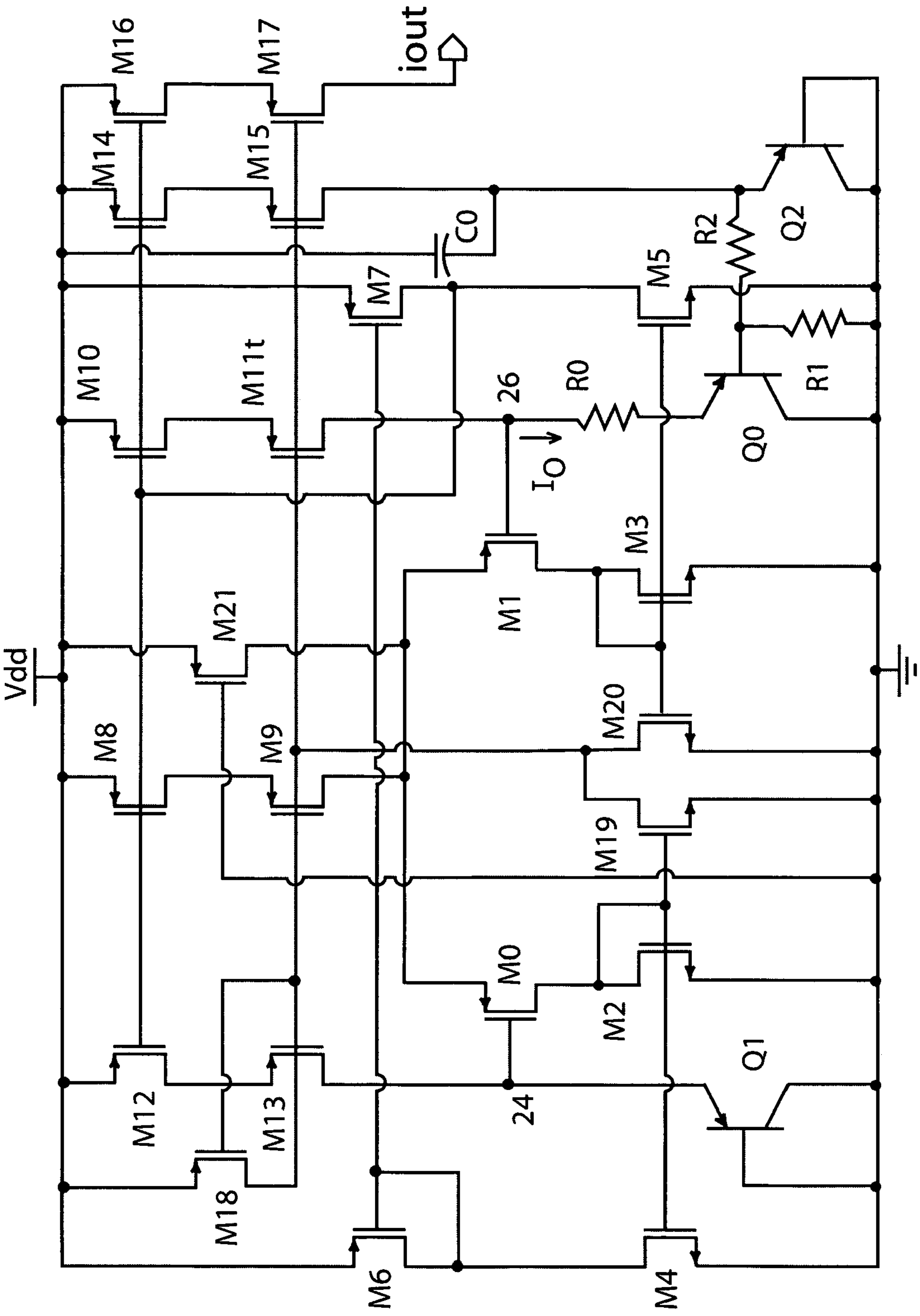
FIG. 3 is a schematic circuit diagram of one embodiment of the invention.

FIG. 3 is a schematic circuit diagram of one embodiment that is capable of using well resistors or high poly resistors that use a much smaller die space and provide the compensation necessary to offset the negative temperature coefficient of the silicon. Well resistors (diffusion resistors) have 16 times higher sheet resistance and 4 times tighter process variation than low sheet resistance poly resistors. As indicated above, however, well resistors suffer from in order of magnitude higher temperature coefficient, which causes the resistor $R_0$ to have a negative temperature coefficient above the coefficient inversion temperature, which for the well resistor is about 17° C. The base to emitter voltage in silicon, as pointed out above, also has a negative temperature coefficient. Hence, the resistor R1 in FIG. 1 does not compensate the negative temperature coefficient of Q0, but actually adds to the problem, if a well resistor or high poly resistor is used. In other words, it can be said that above the inversion temperature of resistor $R_0$, the current becomes CTAT, instead of PTAT.

FIG. 3 provides a circuit layout in which the base of transistor Q1 is modulated with a voltage($V_B$) which has positive temperature coefficient below the coefficient inversion temperature($T_0$) and negative temperature coefficient above $T_0$.

$$\frac{\partial V_B}{\partial T} > 0; \text{ for } T < T_0 \quad \text{Eq. 5A}$$

$$\frac{\partial V_B}{\partial T} < 0; \text{ for } T > T_0$$

The positive temperature coefficient of $V_B$ is generated using a constant current through a well resistor $R_1$. The negative coefficient is generated by an appropriate fraction of $V_{BE}$ of Q2. Thus, base voltage modulation of the Q1 transistor is used to cancel the PTAT and CTAT nature of $I_0$ in the resistor $R_0$ over entire operating temperature range. Resistors R1 and R2 and current through them in the circuit of FIG. 3 are selected such that at temperature $T_0$ the voltage drop across R1 and R2 is equal to the required voltage to put the diode connected device Q2 in saturation. Since Vbe of Q2 has a negative temperature coefficient and the well resistors have a positive temperature coefficient, for temperatures below $T_0$, resistors R1 and R2 will develop a lower voltage drop than required voltage to put the transistor Q2 in saturation. Thus, the voltage $V_B$ at the junction of R1 and R2 is controlled by the voltage drop across resistor R1, which gives the required positive temperature coefficient to $V_B$ below temperature $T_0$. Above temperature T0, R1 and R2 require higher and higher voltages, whereas the $V_{BE}$ of transistor Q2 keeps on falling. The current chooses the least resistance path through Q2 over R1 in series with R2. At these high temperatures, R1 and R2 behaves as a resistive divider of voltage $V_{BE}$ of Q2 transistor. Thus again, the temperature coefficient of $V_B$ above $T_0$ is controlled by Vbe and a fraction of it provides the necessary negative temperature to $V_B$. Voltage $V_B$ is used to modulate the base of Q0 and subtract a desired fractional value of the positive and negative temperature coefficient from $V_{RO}$ to cancel the temperature coefficient of the current flowing in R0. To prove the concept, the analysis of the temperature coefficient of the current above $T_0$ is given below. The current $I_0$ flowing through $R_0$ of FIG. 3 is given by the Eq. 6.

$$I_0 = \frac{V_T \ln A - \varepsilon R_1 I_0}{R_0(1+\alpha_1 T+\alpha_2 T^2)};\ \text{for } T < T_0 \qquad \text{Eq. 6}$$

$$I_0 = \frac{V_T \ln A - \frac{R_1}{R_1+R_2} V_{BE2}}{R_0(1+\alpha_1 T+\alpha_2 T^2)};\ \text{for } T > T_0$$

Where A is $A_0I_1/A_1I_0$.

Taking the derivative of the current $I_0$ with respect to temperature for $T<T_0$ gives:

$$\frac{\partial I_0}{\partial T} = \frac{\kappa \ln A}{qR_0(1+\varepsilon R_1/R_0)}\frac{1-\alpha_2 T^2}{(1+\alpha_1 T+\alpha_2 T^2)^2} \qquad \text{Eq. 7}$$

If ratio of R1/R0>>1, then $\partial I_0/\partial T$ is negligible.

Taking the derivative of the current $I_0$ with respect to temperature for $T>T_0$ gives $$\frac{\partial I_0}{\partial T} = \left\{\frac{\kappa \ln A}{qR_0} - \frac{\eta}{R_0}\left(\frac{\partial V_{BE2}}{\partial T} - \alpha_1 V_{BE2}\right)\right\} - \frac{\frac{\eta}{R_0}\left(\alpha_1\frac{\partial V_{BE2}}{\partial T} - 2\alpha_2 V_{BE2}\right)T}{(1+\alpha_1 T+\alpha_2 T^2)^2} - \frac{\frac{\alpha_2}{R_0}\left(\frac{\kappa \ln A}{q} + \eta\frac{\partial V_{BE2}}{\partial T}\right)T^2}{(1+\alpha_1 T+\alpha_2 T^2)^2} \qquad \text{Eq. 8}$$

where $\eta$ is $R_1/(R_1+R_2)$. The last factor in parentheses in Eq. 8 is the third order coefficient (second order curvature compensated reference current). The second to the last factor in parentheses is the second order coefficient. The factor on the far left of Eq. 8 is the first order coefficient.

Equating the first factor of Eq. 8 to zero gives a first order temperature compensated reference current that is provided in Eq. 9.

$$\frac{\kappa \ln A}{q} = \eta\left(\frac{\partial V_{BE2}}{\partial T} - \alpha_1 V_{BE2}\right) \qquad \text{Eq. 9}$$

Eq. 9 involves two unknown terms, i.e., $\eta$ and $V_{BE2}$. Hence, another factor of r.h.s of Eq. 8 must be equated to zero. Equating the last factor of Eq.8 to zero gives the value of design variable $\eta$ as shown in Eq. 11. It is also known that $\partial V_{BE}/\partial T \approx -2$ mV/°C.

$$\frac{\kappa \ln A}{q} = -\eta\frac{\partial V_{BE2}}{\partial T} \qquad \text{Eq. 10}$$

$$\eta = \frac{R_1}{R_1+R_2} = -\frac{\kappa \ln A}{q}\Big/\frac{\partial V_{BE2}}{\partial T} = -\frac{TV_T \ln A}{\frac{\partial V_{BE2}}{\partial T}} \qquad \text{Eq. 11}$$

Substituting the of value of $\eta$ from Eq. 11 in Eq.9 to solve for the second design variable $V_{BE}$ of Q2 transistor gives $$\frac{\kappa \ln A}{q} = -\frac{\kappa \ln A/q}{\partial V_{BE2}/\partial T}\left[\frac{\partial V_{BE2}}{\partial T} - \alpha_1 V_{BE2}\right] \qquad \text{Eq. 12}$$

$$V_{EB2} = -\frac{2}{\alpha_1}\frac{\partial V_{BE2}}{\partial T}$$

Substituting the value of $V_{BE2}$ and $\eta$ in Eq.8 gives the remainder of second order temperature coefficient (TC2).

$$TC2 = \left(\frac{2}{\alpha_1} - \frac{\alpha_1}{2\alpha_2}\right)\frac{\partial V_{BE}}{\partial T} \qquad \text{Eq. 13}$$

The second order temperature coefficient (TC2) is mostly dominated by the cross over distortion at coefficient inversion temperature ($T_0$). At temperature $T_0$, feedback of Eq. 7 is also present, therefore with some iteration in design it can be cancelled out.

The above derivation assumes that each higher order temperature coefficient $V_{BE}$ is smaller than the previous one. The current and device area for Q2 is designed such that it can generate the voltage drop $V_{BE2}$ at temperature $T_0$. Thus, depending upon the current ratio of Q0 and Q1, the resistor ratio $\eta$ can be calculated from Eq. 11. Since $\partial V_{BE}/\partial T$ is a negative quantity, the negative sign on the right hand side of Eq. 11 and Eq. 12 renders these quantities positive. Referring again to FIG. 3, the gate of M0 and the gate of M1 constitute the differential inputs to a differential amplifier formed by M0 and M1. As such, the voltages at node 24 and node 26 are equal. Again, Q0 and Q1 have a device area ratio of A0/A1 and a current ratio of I0/I1. Assuming temperature independent current flows through R0 in this circuit, a fraction of this current is mirrored back to Q2. Hence, the base of Q0 is modulated by a voltage $V_B$, which is generated using R1, R2 and Q2. For temperature $T<T_0$, $V_{BE2}$ will be higher than $\epsilon I_0(R_1+R_2)$. Therefore, $V_B$ is defined by the drop across the resistor R1 and, consequently, has a positive temperature coefficient. For temperature $T>T_0$, $V_{BE2}$ is smaller than $\epsilon I_0$ $(R_1+R_2)$ Therefore, $V_B$ is defined by the resistive ratio ($\eta$) of the voltage drop $V_{BE2}$, and in return has a negative temperature coefficient. The voltage $V_B$ generated by R1, R2 and Q2 is subtracted from the PTAT voltage across R0 by modulating the base of transistor Q0. Hence the circuit shown in FIG. 3, using R0, R1, R2, Q0, Q1 and Q2, is one form of circuit implementation of Eq. 6.

The positive feedback loop, consisting of M0, M2, M4, M6, M7, M12 and M13, boosts the startup current from M21 to the desired value. The negative feedback loop consisting of M1, M3, M5, M10 and M11 stabilizes the loop from a runaway condition. The components M1, M3, M5, M14, M15, R2, Q0 and R0 form another feedback loop which stabilizes the temperature coefficient of the current. The device M21 is a startup device that ensures that there is always a current for the differential amplifier formed by M0 and M1. Components M19 and M20 mirror a small portion of the differential amplifier current to establish a cascade voltage for the current sources in the circuit. The current flowing through M19 and M20 are summed together so that there is always current available for M18 to avoid startup problems. The gain of the negative feedback loop is higher than the positive feedback loop to avoid a current runaway. The impedance at the drain of M13 is $1/g_{m1}$. The impedance at the drain of M11 is R0+$1/g_{m0}$+(R1/$\beta$), which is greater than $1/g_{m1}$. The load at the drain of M11 defines the negative loop gain, and M13 defines the positive loop gain.

Figure 4:
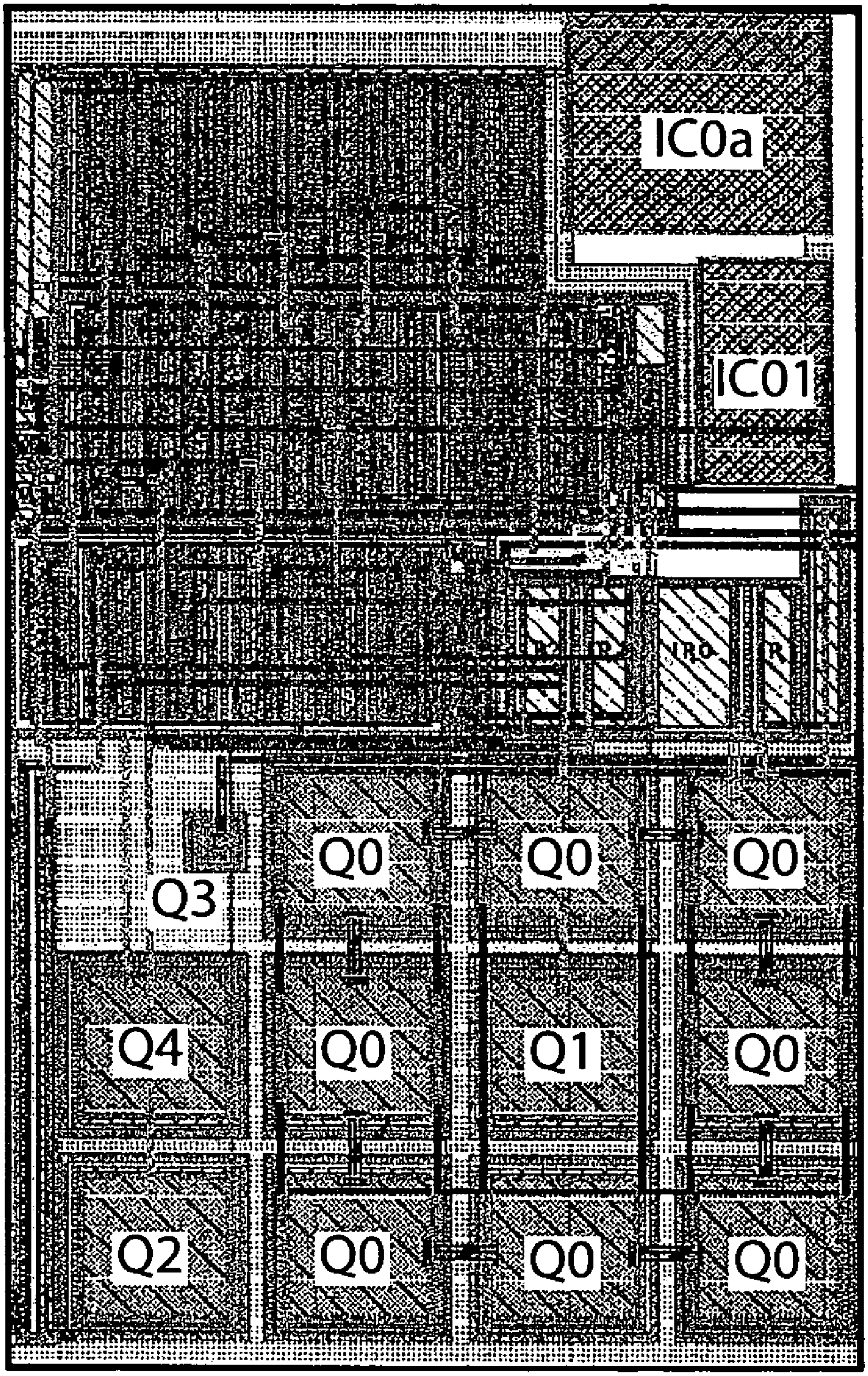
FIG. 4 is an illustration of a layout of the embodiment of FIG. 3.

FIG. 4 illustrates a layout of the circuit illustrated in FIG. 3. It can be observed that the resistors R0, R1 and R2 take less than 10 percent of the die area. Low sheet resistance poly resistors, along with trim, consume more than 50 percent of the die area, as disclosed in Rasoul Deghani, S. M. Atarodi, A New Low Voltage Precision CMOS Current Reference with No External Components, *IEEE Transactions on Circuits and Systems-II*, pp. 928-931, IEEE, December 2003.

Figure 5:
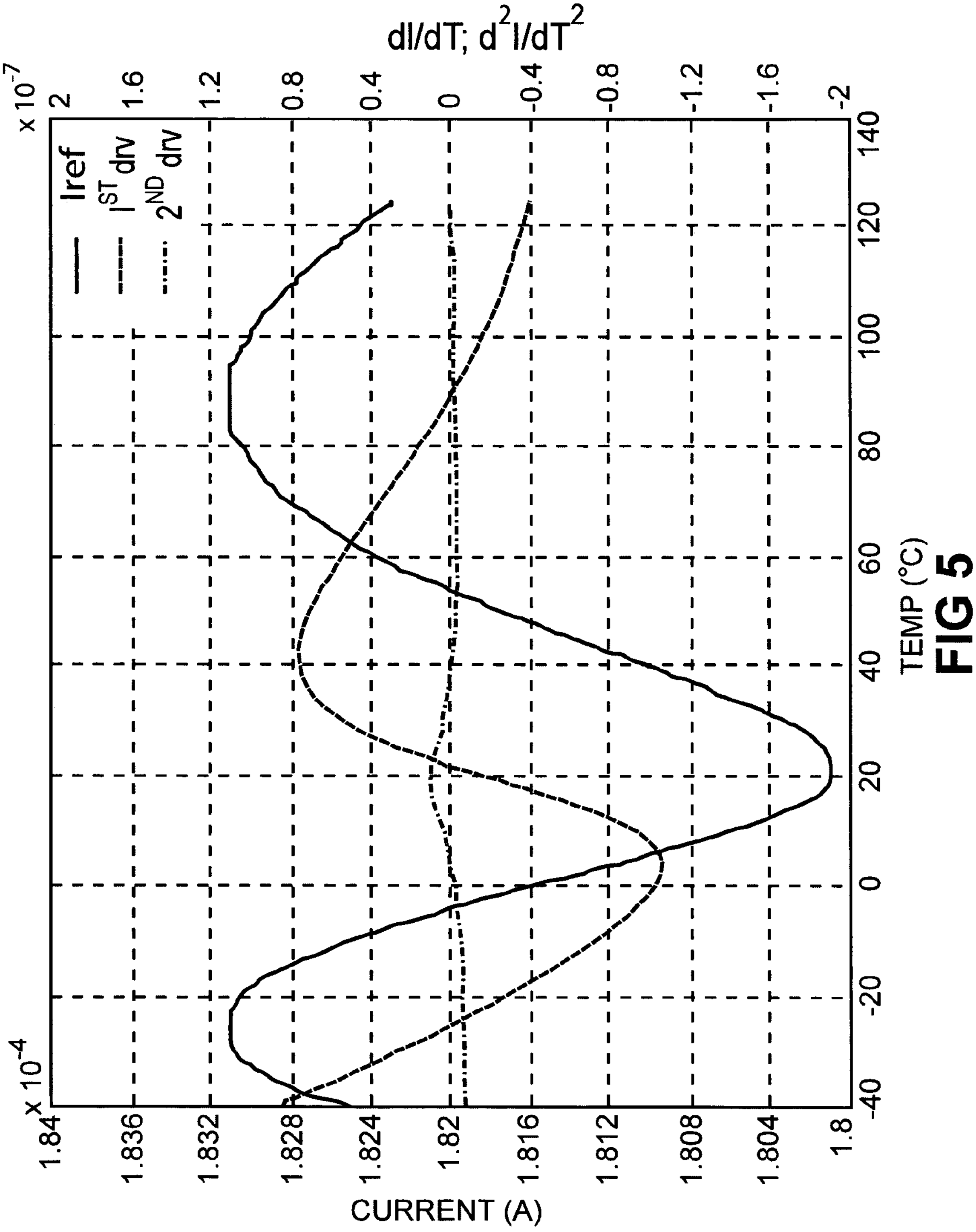
FIG. 5 is a graph of the response of the embodiment of FIG. 3.

FIG. 4 was simulated in a 0.5 μm CMOS process. The simulation results of the reference current and first and second order derivatives are shown in FIG. 5. The simulated reference current has two zero crossing points. Hence, the reference current has a third order temperature cancellation or second order curvature compensation. The first and second order derivatives are also plotted along with the current in FIG. 5. The second order derivative has a second order effect.

Figure 6:
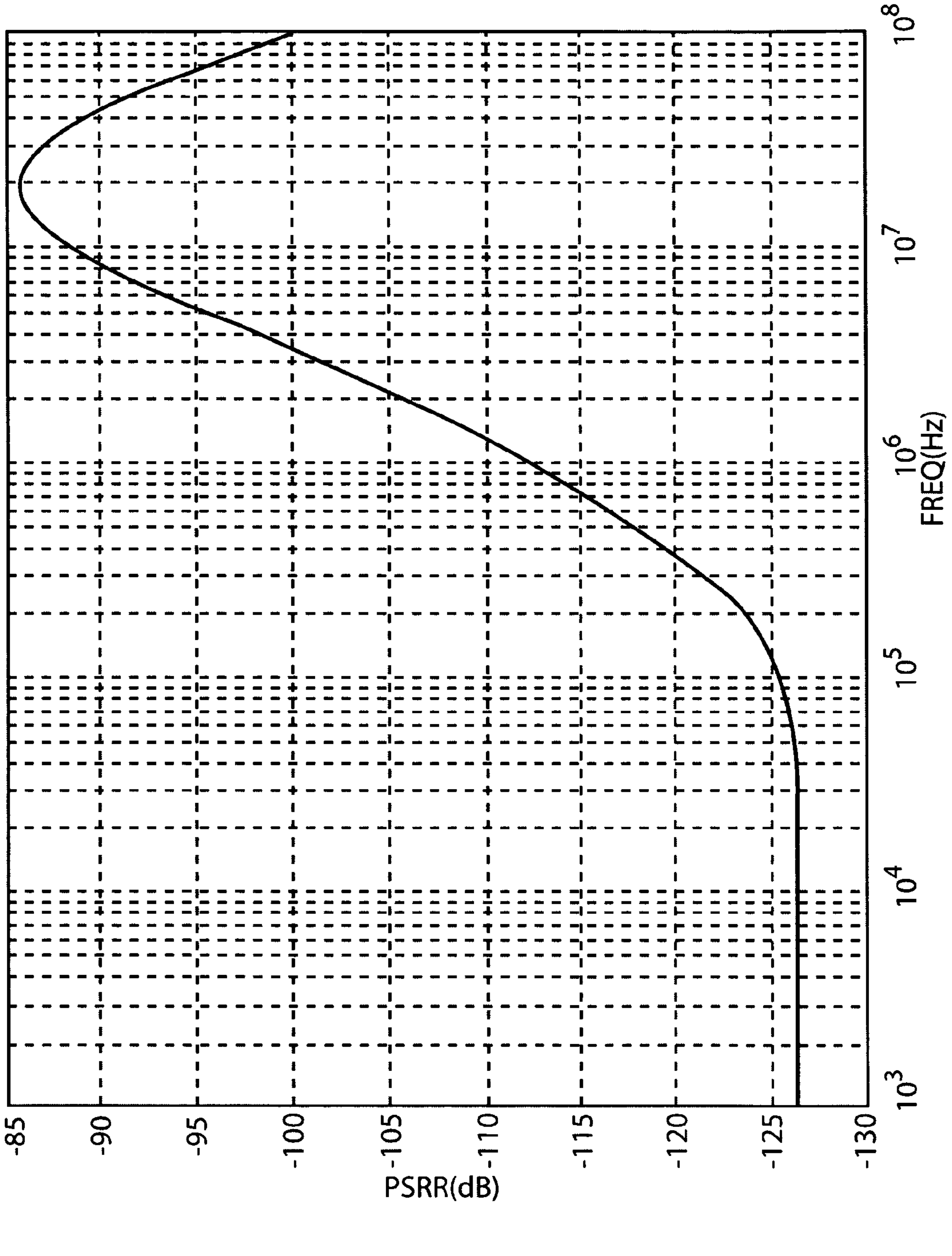
FIG. 6 is a graph of the response of the embodiment of FIG. 3.

The reference current has a variation of ±0.8% across the temperature range of −40° C. to 125° C. The power supply rejection ratio (PSRR) of the current is plotted against frequency in FIG. 6 for the current shown in FIG. 4. The current has a PSRR of −125 dB at 100 KHz.

Figure 7:
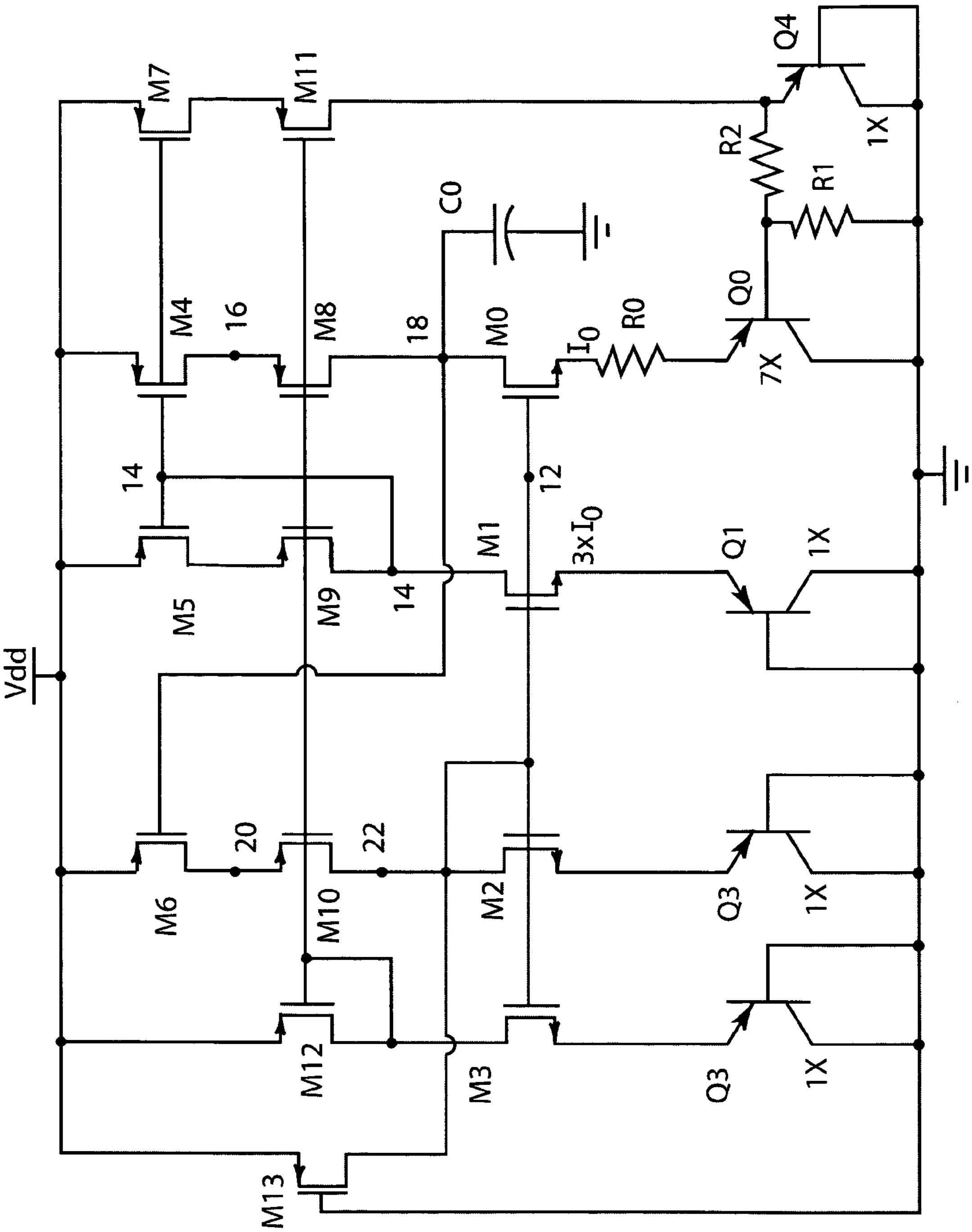
FIG. 7 is a schematic circuit diagram of another embodiment of the invention.

The above mathematical derivation can have many other implementations, which can be identified by an expert in the area of circuit design. For example, FIG. 7 illustrates another embodiment. M2, M1 and M0 have good current sources. M2 is laid out in the same configuration in FIG. 7 as M2 in FIG. 1. Transistors M4, M5 and M6 cascode the current sources M8, M9 and M10. By cascoding the current sources, the output resistance of the current sources is increased. Hence, transistors M8, M9 and M10 constitute a new layer of current sources. M12 provides a bias potential for the gates of M8, M9 and M10. M3 constitutes another current source for M2, M1 and M0. It is desirable to have the same gate to source voltage on M3 as M2 so that a current mirror is created. So, another transistor, Q3 is added which is the same size as Q2.

Eq. 12 is the voltage from which the current in M7 and M11 can be calculated. The current provided by M7 and M11 are used to modulate the base of transistor Q0 using transistor Q4. In this fashion, a portion of the negative coefficient of temperature is subtracted from Q0 for $T>T_0$, as explained above with respect to FIG. 3.

Both positive and negative feedback loops are provided in the circuit of FIG. 7. The positive feedback loop starts at node 12 and proceeds to node 14 which changes the sign to a minus. From node 14 the loop proceeds from the base of M4 to node 16, and the sign changes to plus. The feedback loop then proceeds from M8 to node 18, and the sign remains the same, i.e., plus. The feedback loop then proceeds from node 18 to node 12, and the sign changes to a negative. Hence, the feedback loop of M1, M4, M8 and M0 is a negative feedback loop and keeps the circuit from runaway conditions.

The positive feedback loop starts at node 12 and proceeds from the base of M0 to node 18 where the sign changes to minus. The positive feedback loop then proceeds from the base of M6 to node 20 where the sign changes to plus. The positive feedback loop then proceeds from node 20 to node 22 (node 12) and the sign remains the same, i.e., plus. A positive feedback loop is therefore provided by M0, M6 and M10.

Hence, various embodiments disclosed herein ameliorate the problems of the negative temperature coefficient of the Q0 transistor by modulating the base of the Q0 transistor with a CPTAT voltage that is inversely proportional to temperature. In other words, a fraction of the $V_{BE}$ of Q2 (FIG. 3) or Q4 (FIG. 7) is used to modulate the base of the transistor Q0. By using the resistor divider circuit R1 and R2, a fraction of the $V_{BE}$ of Q2 (FIG. 3) or Q4 (FIG. 7) is subtracted from the PTAT voltage across resistor R0($V_{RO}$) and thereby cancels the negative temperature coefficient of current that is above the coefficient inversion temperature of R0, above temperature $T_0$. In this manner, well resistors such as diffusion resistors or high sheet resistance poly resistors can be used that do not occupy a large space on the semiconductor die and that have much better process variation control so that a more accurate system is provided.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A bandgap circuit comprising:

first and second transistors that have gates that are connected and are driven by a common gate voltage, said first and second transistors having sizes that are proportional to the current flowing through said first and second transistors so that the voltages at the sources of said first and second transistors are substantially equal;

a reference resistor connected to the source of said first transistor;

a first reference transistor having an emitter that is connected to said resistor and a collector connected to ground;

a second reference transistor having an emitter connected to said second transistor and a collector connected to ground;

a resistor divider circuit connected to the base of said first reference transistor;

a modulating transistor connected to said resistor divider circuit that modulates the base of said first reference transistor with a fraction of voltage difference between the base and emitter of said modulating transistor to substantially cancel the temperature coefficient of current flowing through said reference resistor.

2. The bandgap circuit of claim 1 wherein said reference resistor and said resistor divider circuit are diffusion resistors.

3. The bandgap circuit of claim 1 wherein said reference resistor and said resistor divider circuit are high sheet resistance poly resistors.

4. The bandgap circuit of claim 1 further comprising a differential amplifier having differential inputs connected to the sources of said first and second transistors so that the sources of said first and second transistor are maintained substantially equal.

5. A method of generating a reference voltage in a bandgap circuit comprising:

generating a first voltage at the source of a first transistor that is substantially equal to a second voltage at the source of a second transistor by connecting the gates of said first and second transistors to a common driver, and matching the component sizes of said first and second transistors with the amount of current passing through said first and second transistors;

connecting the source of said first transistor to a reference resistor;

connecting said reference resistor to a first reference transistor;

connecting the source of second transistor to a second reference transistor;

connecting the base of said first reference transistor to a resistor divider circuit;

connecting said resistor divider circuit to a modulating transistor that modulates said base of said first reference transistor with a fraction of the voltage difference between the base and emitter of said modulating transistor so as to substantially cancel the temperature coefficient of current through said reference resistor.

6. The method of claim 5 wherein said reference resistor and said resistor divider circuit are diffusion resistors.

7. The method of claim 5 wherein said reference resistor and said resistor divider circuit are high sheet resistance poly resistors.

8. The method of claim 5 further comprising:

providing a differential amplifier having differential inputs that are connected to said sources of said first and second transistors to maintain said sources of said first and second transistor at substantially the same voltage.

* * * * *